United States Patent Office 3,113,969
Patented Dec. 10, 1963

3,113,969
PREPARATION OF QUATERNARY AMMONIUM
SUBSTITUTED BUTADIENES
Donald Eldon Welton, Victoria, Tex., assignor to E. I.
du Pont de Nemours and Company, Wilmington, Del.,
a corporation of Delaware
No Drawing. Filed Oct. 6, 1958, Ser. No. 765,322
1 Claim. (Cl. 260—567.6)

This invention relates to quaternary ammonium substituted butadienes, and in particular to butadienes having a single quaternary ammonium substituent at a terminal carbon atom.

Heretofore, it has been known that quaternary ammonium substituted unsaturated compounds could be polymerized with monomers having terminal methylene groups to form polymers having antistatic properties, enhanced dye receptivity and other desirable properties due to the hydrophilic character of the quaternary ammonium group. The monomers employed for the manufacture of these polymers have only a single polymerizable functional group and hence are incapable of producing cross-linked material. Further, it has been known heretofore, that valuable anion exchange resins may be produced by introducing quaternary ammonium groups into polymers, and that it is highly desirable to introduce at least some polyfunctional monomer into the polymer in order to promote cross-linking (J. A. Kitchener, Ion Exchange Resins, 1957, p. 14, Wiley and Sons, New York, New York).

For example, U.S. Patent No. 2,597,440, issued May 20, 1952, to George W. Bodamer, discloses the manufacture of strongly basic anion-exchange resins by forming a proliferous styrene polymer, preferably a copolymer with a proliferating agent, and subsequently introducing quaternary ammonium groups. The function of the proliferating agent is to introduce cross-linking. Among the agents employed are butadiene and other conjugated dienes such as isoprene and cyclopentadiene. Thus, a combination of butadiene with a quaternary ammonium group may be used to proliferate the polymer and simultaneously to introduce quaternary ammonium groups.

It is an object of this invention to produce butadiene with a quaternary ammonium substituent. Another object of this invention is to produce a monomeric material, capable of polymerization, which contains both a quaternary ammonium group and a conjugated diene group. Other objects will become apparent from the ensuing description of the invention.

Bis-quaternary ammonium derivatives of butene are known in the art [Hurd and Ensor, J. Am. Chem. Soc. 72, 5135 (1950)]. These substances may be prepared by treatment of dihalobutenes with tertiary amines. I have discerned that when either the 1:4 bis-(trialkylammonium) butene-2 dihalides or the 3:4 bis-(trialkylammonium) butene-1 dihalides are treated in aqueous solution with an alkali and heated to a temperature near the boiling point, a smooth, rapid and quantitative reaction occurs in which a trialkylamine molecule is eliminated and a butadiene having a single quaternary ammonium substituent is produced. These products were heretofore unknown. The reaction that takes place in treating the bis-trialkylammonium butene salt is a modification of the well-known Hofmann degradation of quaternary amines,
and will compete with the elimination of alkyl substituents attached to the nitrogen atom provided that these compounds have a hydrogen atom attached to the $\beta$-carbon atom of the said alkyl substituent. However, the reaction with alkali to produce a quaternary ammonium substituted butadiene proceeds with such facility that the said substituted butadienes are formed by the action of mild alkaline reagents such as sodium carbonate which will not bring about the Hofmann degradation. Thus, in general, substantially the only product of treating bis-(trialkylammonium) butene salts with alkali is a trialkylammonium butadiene salt.

Both 1:4 bis-(trialkylammonium)-2-butene dichloride and 3:4 bis-(trialkylammonium)-1-butene dichloride, prepared by the action of given trialkylamine on either 1:4 dichloro-2-butene or 3:4 dichloro-1-butene, react to give the same product, 1-trialkylammonium-1:3-butadiene chloride. Thus, either 1:4 dichloro-2-butene or 3:4 dichloro-1-butene or a mixture of the two dichloro butenes such as that obtained by chlorinating butene may be employed as convenient starting materials for the products of the invention.

The bis-quaternary ammonium salts of butene are in general extremely hygroscopic and difficult to isolate. Such isolation is not essential, since solutions of these materials are all that is required to perform the reaction of the invention. However, I have also found that the bis-quaternary ammonium salts of butene form complexes with mercuric chloride that are insoluble in aqueous solution, and that such complexes may be used for the assay of such solutions. Further, I have observed that the bis-quaternary ammonium butenes will undergo the reaction of the invention even when said bis-quaternary ammonium butenes are bound in complexes with mercuric chloride.

In general, the reaction of the dihalobutene with trialkylamines becomes progressively more difficult as the size of the hydrocarbon radicals is increased. However, the reaction of the bis-(trialkylammonium) butene dichlorides with alkali to give 1-trialkylammonium-1:3-butadiene chloride appears to be substantially independent of the size of the alkyl radicals. Nevertheless, the smaller alkyl substituents are preferred, in that the necessary intermediates, bis-(trialkylammonium) butene salts, may be obtained with greater ease.

Halide salts of the bis-(trialkylammonium) butene are preferred as starting materials, since these materials may be obtained by reaction of the corresponding dihalobutene with a trialkylamine. However, other salts may be used for the reactants with equal facility. Such salts may be prepared by simple metathetical reactions. Similarly, the anion in the product may be varied to incorporate a wide variety of anions such as phosphate, nitrate, sulphate, hydroxyl, acetate, benzoate, etc., by metathesis.

With regard to the alkali that is used to accomplish the reaction of the invention, any akali which will yield substantial amounts of hydroxyl ions in an ionizing solvent may be employed, for example, alkali metal hydroxides, carbonates or hydroxides of the alkali earth metals are all effective in accomplishing the reaction of the invention.

The solvent which is employed is likewise unimportant, provided that the reactants will completely or partially dissolve in said solvent to give ionized solutions. For example, water solutions may be employed conveniently for my process or alcoholic solutions may be used.

Thus, in its broadest aspect the invention by which the above objects are achieved in composition of the hitherto unknown compounds of the type:

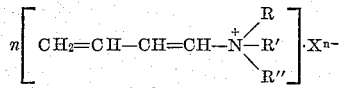

where R, R' and R" are hydrocarbon radicals free from olefinic, acetylinic and aromatic unsaturation, and $X^{n-}$ is an anion, and a process for making said unknown compounds by treatment of 1:4 bis-(trialkylammonium)-2-butene dichloride or 3:4 bis-(trialkylammonium)-1-butene dichloride with a solution of an alkali and distilling the trialkylamine formed from the reaction mixture.

The materials obtained by the process of the invention are solids which dissolve in water giving solutions which conduct electricity. Butadienes, substituted with a quaternary ammonium group having small alkyl radicals are exceedingly hygroscopic. Thus, 1-trimethylammonium butadiene 1:3 chloride liquifies substantially immediately on exposure to moist air. Water of crystallization is frequently retained by the compounds, but can be removed by vacuum distillation.

Moderately concentrated solutions of the 1-trialkylammonium compounds are stable at the boiling point of the said solutions. However, very concentrated solutions and the pure solid materials yield brittle resins on heating to a temperature near 100° C.

The invention is further illustrated by the following examples. It must be clearly understood that these examples are merely by way of illustration and are not intended to define the scope of the invention on the limits of the appended claim.

EXAMPLE I

*Synthesis of 4-Bis-(Trimethylammonium Chloride)-2-Butene and Trimethylammonium Butadiene Chloride*

A solution of 15.3 g. trans 1,4-dichlorobutene-2 and 20 g. trimethylamine in 150 ml. benzene was heated at 100° in a pressure-tight bottle for one hour, then cooled. The crystalline product, 1,4-bis-(trimethylammonium)-2-butene dichloride was filtered off, washed with benzene and chloroform, then dried at 100° in vacuo to yield 28.5 g. (95% theory) of a white crystalline powder. The anhydrous crystals were hygroscopic and on exposure to air or recrystallization from isopropyl alcohol and air drying at room temperature, were converted to a monohydrate containing 7.5% water (theory for $$C_{10}H_{24}N_2Cl_2 + OH^- \rightarrow N(CH_3)_3 + Cl^- + H_2O = 243$$

g./mol evolved amine).

A larger sample (10.0 g.) of the anhydrous bisquaternary salt was placed in a 300 ml. Kjeldahl flask and dissolved in a mixture of 20 ml. 10% NaOH and 40 ml. water. The flask was connected to a condenser and the charge was distilled until the condensate became neutral (10–15 min.). The residual solution in the flask was neutralized to pH 7 with hydrochloric acid, decolorized with charcoal and filtered. The colorless filtrate was vacuum-evaporated to a residual solid, further dehydrated by adding 50 ml. chloroform and boiling to dryness (steam bath), then extracted with 50 ml. chloroform and filtered to remove sodium chloride.

Vacuum evaporation of the chloroform left an orange-red crystalline solid which, after drying to constant weight at room temperature at 200 microns of mercury absolute pressure weighed 5.6 g. (>90% yield). The product, trimethylammonium butadiene chloride, was extremely hygroscopic, liquefying rapidly on exposure to ambient air.

*Analysis.*—Calculated for $C_7H_{14}NCl$; percent $Cl^\ominus$ =24.1, percent N=9.5. Found: percent Cl=23.2, percent N=8.6.

The product above was incompletely hydrated and contained a small amount of polymerization products due to the stripping at 100° C. A white, substantially anhydrous (approximately ⅓ mol $H_2O$/mol of salt) product was obtained by decolorizing the aqueous solution with charcoal, vacuum stripping at room temperature and drying at less than 1 mm. pressure over $P_2O_5$.

*Analysis.*—Percent $Cl^\ominus$=23.3, percent N=9.2.

Its infrared spectrum in chloroform vs. chloroform reference showed a major absorption peak at 10.01μ, others at 3.00, 6.71, 9.19, 10.40 and 10.52μ.

EXAMPLE II

*Synthesis of 3,4-Bis-(Trimethylammonium)-1-Butene Chloride and Trimethylammonium Butadiene Chloride*

A solution of 14.9 g. 3,4-dichlorobutene-1 and 20 g. trimethylamine in 150 ml. benzene heated at 100° for 1½ hours then evaporated to dryness at 100° C., extracted repeatedly with chloroform and redried at 100° under vacuum gave 21.6 g. (75% yield) of anhydrous 3,4-bis-(trimethylammonium)-1-butene chloride as a tan powder. Recrystallization from 15 vol./g. isopropyl alcohol and drying at room temperature in air gave 75% recovery as a white, crystalline monohydrate containing 8.5% water (removed by heating in air at 105–110° C.). M.P. of the anhydrous salt: 285–290° (decomp.).

On boiling the above salt with caustic soda, trimethylamine was generated to the extent of one mol nitrogen per 240 g. salt and Kjeldahl analysis for nitrogen content of the residual caustic solution contained an additional one mol nitrogen per 248 g. salt, indicating a total nitrogen content of one mol nitrogen per 122 g. salt (theoretical for $C_{10}H_{24}N_2Cl_2$=1 mol nitrogen per 122 g. salt).

A 10.0 g. sample of the anhydrous salt was treated with caustic soda by the same procedure as the diquaternary salt derived from trans 1,4-dichlorobutene-2 in Example I. The residue from evaporation of the chloroform extract of the neutralized dry salt was 6.0 g. (98% theory) of trimethylammonium butadiene chloride. It was dissolved in water, decolorized, then vacuum stripped and dried over $P_2O_5$ at <1 mm. Hg absolute pressure, giving 4.2 g. of white crystals which were extremely hygroscopic.

*Analysis.*—Calculated for $C_7H_{14}NCl$: percent Cl=24.1, percent N=9.5. Found: percent Cl=22.5, percent N=8.8.

The infrared spectrum of a chloroform solution of this product was identical with that obtained in Example I.

EXAMPLE III

*1,4-Bis-(Triethylammonium)-2-Butene Chloride and Triethylammonium Butadiene Chloride*

A solution of 11.7 g. trans 1,4-dichlorobutene-2, 29 g. of triethylamine and 11 ml. toluene was heated in a closed bottle for 3 hours at 100° C. The crystalline product obtained on cooling was filtered off, washed with benzene and vacuum dried at 100° C., giving 19.2 g. (73% yield calculated as $C_{16}H_{36}N_2Cl_2$) of crude 1,4-bis-(triethylammonium)-2-butene dichloride. This product could not be successfully recrystallized from usual solvents, so was converted to, and analyzed as, its mercuric chloride complex salt.

A 6.1 g. sample of crude salt was dissolved in 50 ml. water, decolorized with charcoal, filtered and treated with 20 ml. of a solution of 0.2 g. mercuric chloride in 95% ethyl alcohol. Heating, then cooling, gave a white crystalline precipitate which was filtered off and air dried. Yield 13.6 g. of 1,4-bis-(triethylammonium)-2-butene dichloride, tetramercurichloride, $C_{16}H_{36}N_2Cl_2 \cdot 4HgCl_2$.

Kjeldahl analysis of the mercuric chloride complex showed 1.30 mmol nitrogen per g. sample. An additional analysis in which the organic portion was split to form triethylammonium butadiene chloride was accomplished by boiling 1.3774 g. sample in 25 ml. of 10% NaOH in a Kjeldahl apparatus. Triethylamine was evolved equivalent to 0.658 mmol/g. of sample, mercuric oxide was precipated equivalent to 2.49 mmol/g. of sample, and the ionic chloric in the residual caustic solution was equivalent to 6.80 mmol/g. of sample. These data indicate the formula of the mercuric chloride complex to be $C_{16}H_{36}N_2Cl_2 \cdot 4HgCl_2 \cdot HgCl_2$, formula weight 1413, calculated total $N=1.41$ mmol/g., $Hg=2.83$ mmol/g. and ionic chloride 7.18 mmol/g. and agree with the assumed reaction with caustic to form triethylammonium butadiene chloride in solution:

$C_{16}H_{36}N_2Cl_2 \cdot 4HgCl_2 + 9NaOH$
$\rightarrow C_{10}H_{20}NCl + N(C_2H_5)_3 + 4HgO + 9NaCl + 5H_2O$ theoretical for amine evolved=0.708 mmol/g. sample.

I claim:

A process for the manufacture of 1-quaternary ammonium butadiene salts which comprises mixing a compound selected from the class consisting of 1:4-bistrialkylammonium-2-butene dichloride and 3:4-bistrialkylammonium-1-butene dichloride in which the alkyl groups are lower alkyl groups, with an alkali metal hydroxide in water, distilling trialkylamine from the mixture and thereafter recovering 1-trialkylammonium 1:3-butadiene chloride from the solution.

References Cited in the file of this patent

UNITED STATES PATENTS

| | | |
|---|---|---|
| 2,136,177 | Carothers et al. | Nov. 8, 1938 |
| 2,301,971 | Reppe et al. | Nov. 17, 1942 |
| 2,647,147 | Engelhardt | July 28, 1953 |

FOREIGN PATENTS

| | | |
|---|---|---|
| 715,544 | Germany | Dec. 23, 1941 |
| 927,627 | Germany | May 12, 1955 |

OTHER REFERENCES

Noller: Chemistry of Organic Compounds, 1st Edition, W. B. Saunders Co., Philadelphia, pages 237–238 (1951).